United States Patent [19]
Demurger

[11] 3,752,022
[45] Aug. 14, 1973

[54] SAWING METHOD AND MACHINE
[75] Inventor: Jacques L. J. Demurger, Roanne, France
[73] Assignee: Etablissements Demurger & Cie, Roanne, France
[22] Filed: July 19, 1971
[21] Appl. No.: 163,876

[30] Foreign Application Priority Data
July 24, 1970 France .............................. 7027427

[52] U.S. Cl. ..................................... 83/13, 83/801
[51] Int. Cl. ............................................ B23d 55/08
[58] Field of Search .................... 83/201.06, 201.04, 83/647, 582, 13, 801; 251/209

[56] References Cited
UNITED STATES PATENTS
2,182,289 12/1939 Eisenlohr ............................. 83/647
3,575,074 4/1971 Aizawa et al. .................... 83/201.06
1,390,469 9/1921 Stowell ............................ 83/201.06
3,092,146 6/1963 Plass ................................ 251/209 X Primary Examiner—J. M. Meister
Attorney—Irvin S. Thompson and Robert J. Patch

[57] ABSTRACT

Method and machine for sawing a workpiece by means of a cutting tool, such as a band saw or saw blade, carried by a support. A hydraulic cylinder device controls the travel of the support and consequently the feed of the cutting tool. The working chamber of the cylinder device has a constant pressure which is a multiple of the maximum force opposing the feed of the tool. The rate of feed of the cutting tool into the workpiece is substantially constant owing to the fact that the liquid in the other chamber of the cylinder device opposed to the working chamber is made to flow out of the other chamber at a constant rate.

3 Claims, 3 Drawing Figures

Patented Aug. 14, 1973    3,752,022

Patented Aug. 14, 1973 3,752,022

SAWING METHOD AND MACHINE

The present invention relates to sawing machines whose cutting tool or blade is carried by a support which is movable with respect to a frame and shifted by at least one double-acting hydraulic fluid motor or cylinder device connected to the frame.

Whether the cutting tool be an endless band saw, a reciprocating saw or a circular saw, the feed of the cutting tool-support assembly, that is, the speed of penetration through the workpiece to be sawn, depends on a force F which urges the tool against the workpiece, for example under the effect of the force of gravity. This force must overcome the opposing force F' which is, in particular, a function of the following parameters:
dimensions of the section of the workpiece;
shape of this section;
nature of the material to be cut;
type of teeth of the tool;
state of wear of the tool.

Owing to the fact that in known machines the force F is relatively moderate, it being the result of either the weight of the support or a slight pressure exerted in the hydraulic cylinder device, and owing to variations in the aforementioned parameters for sawing operations on different workpieces or even in the course of a sawing operation on the same workpiece, it has been found necessary, in order to achieve rational cutting conditions, to introduce, by the effect of a variable pressure exerted in the corresponding chamber of the cylinder device, a compensating auxiliary force which is added to the force F', which gives a resultant force F'' so that the difference F − F'' is roughly constant.

The rate of feed of the tool also depends on the speed at which the cutting tool travels across the workpiece.

It is clear from this analysis that it is very difficult to determine perfectly the compensating force in the course of sawing, this determination being practically impossible when the dimension of the workpiece parallel to the direction of feed of the tool is very variable. In any case, a rational operation of the machine requires much skill and experience.

In order to overcome the aforementioned difficulties, an object of the present invention is to provide a new sawing method comprising applying the cutting tool against the workpiece to be sawn, during the sawing operation and through the medium of the support, by the effect of a constant hydraulic pressure exerted in the working chamber of the cylinder device so that the force F exerted on the support by this pressure is a multiple of the maximum opposing force F, and causing the liquid contained in the other chamber of the cylinder device to flow in accordance with a constant rate so that the rate of feed of the cutting tool is substantially constant.

Owing to the fact that the force F producing the feed is large with respect to the opposing force F', this force F' becomes negligible with respect to F so that the difference F − F' differs but slightly from F and can therefore be considered as constant. Further, as the rate of flow of the liquid discharged from the cylinder device can be controlled, the feed of the tool is constant and independent of the cutting speed of the tool.

The machine operator therefore does not have to take into account the aforementioned various parameters so that the machine becomes very easy to operate, the sole independent variables available to the operator being the rate of discharge from the cylinder device and the cutting speed of the tool which have no need to be modified in the course of a given operation.

In particular owing to the fact that the feed is independent of the teeth of the cutting tool, a single type of teeth may be employed for all the cutting operations, which is also a factor of rational operation and economy.

A constant rate of fluid discharge from the chamber of the cylinder device opposed to the working chamber may be achieved by different means, for example by a manually adjustable throttle or constriction disposed between the discharge chamber and the tank for the liquid supplied to the cylinder device by a pump. This throttle is normally integrated in a flow regulator including a check valve which is mounted in a by-pass conduit by-passing the throttle for the inoperative return-travel of the cutting tool support.

For example, the force F may be equal to 3,000 kg, whereas it is 300 kg in a conventional machine, the difference F − F' varying practically between 2,700 and 3,000 kg.

Further features and advantages of the invention will be apparent from the ensuing description with reference to the accompanying drawings.

Figure 1:
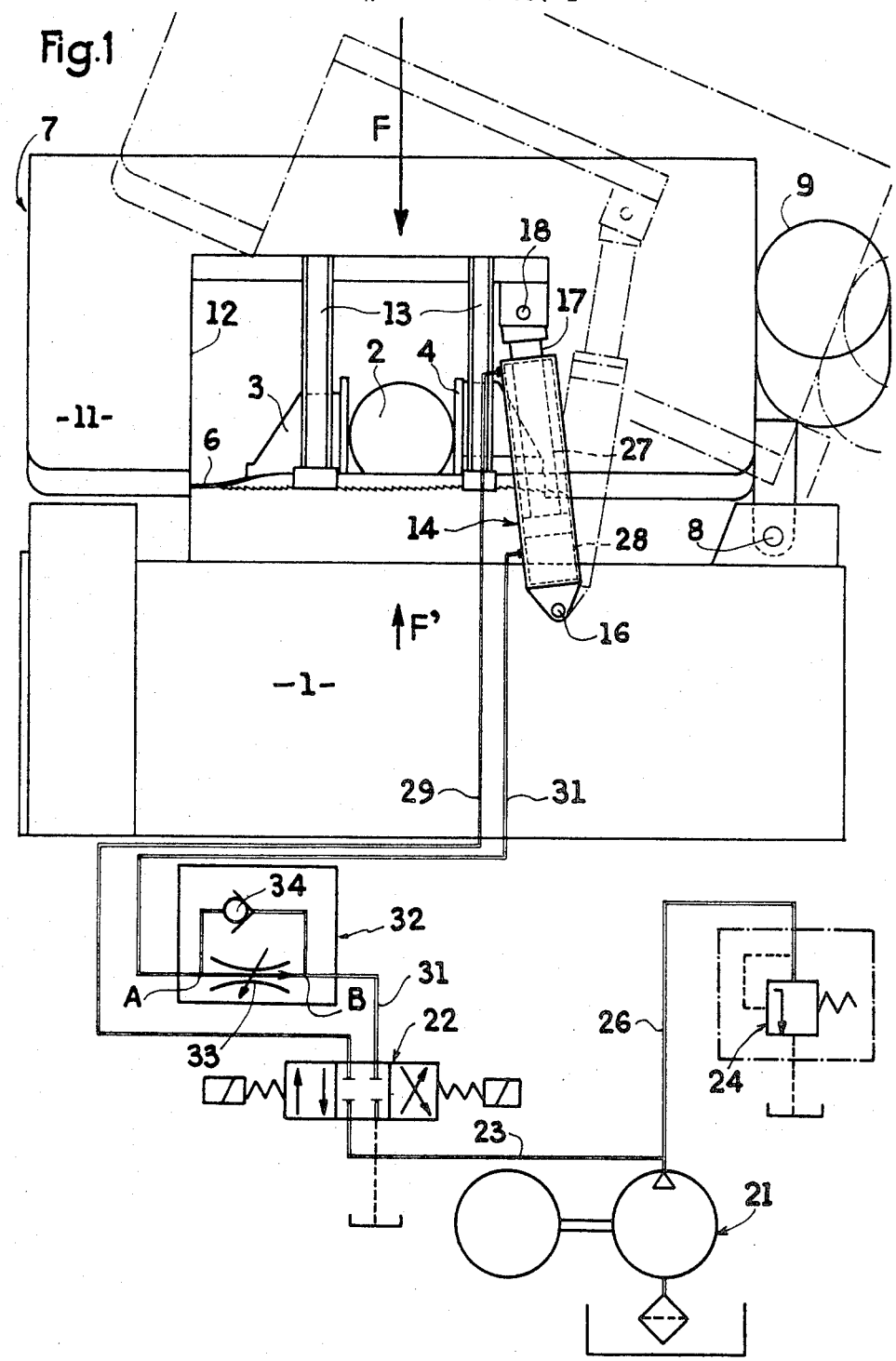
FIG. 1 is a diagramatic view of a sawing machine having a pivotal cradle whose hydraulic fluid motor or cylinder device is connected to a control circuit including a flow regulator.
Figure 3:
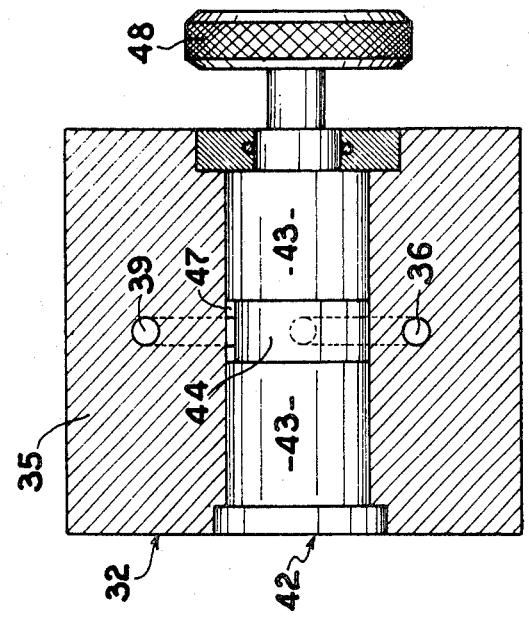
FIG. 3 is a sectional view taken along line 3-3 of FIG. 2.

On the frame 1 of the sawing machine shown in FIG. 1 there is fixed between two clamping jaws 3, 4 the workpiece 2 which must be sawn by a cutting tool or band saw 6 carried by a cradle 7 which is pivoted at one end at 8 to the frame 1. The band saw 6 is driven continuously by a motor 9 and guided by guide means (not shown) housed inside a generally rectangular case 11 in which an opening 12 exposes the band saw 6 for cutting the workpiece 2. In this opening there are mounted, by means not shown in detail, two band guides 13 which give the band saw between the two jaws 3, 4 an orientation parallel to the sawing plane and usually perpendicular to the main dimension of the workpiece 2.

In order to reduce the twist imparted to the band saw by the guides 13, the case 11 is mounted rearwardly inclined with respect to the upper table of the frame.

The angular movement for shifting the cradle 7 toward or away from the workpiece 2 is produced by a double-acting fluid motor or cylinder device 14 whose body is pivoted to the frame at 16 and whose piston rod 17 is pivoted to the cradle 7 at 18 in the region of the upper right corner of the opening 12 as viewed in FIG. 1.

The cylinder device 14 is actuated by the pressure of liquid produced by an electric pump 21 which is connected to an electrically-operated valve 22 having three positions by a conduit 23 in which the pressure is limited by a safety valve 24 which is connected to the conduit 23 by a conduit 26.

The upper chamber 27 of the device 14 is directly connected to the valve 22 through a conduit 29 and the lower chamber 28 is connected to the valve 22 through a conduit 31 in which is inserted a flow regulator 32 comprising, arranged in parallel between the points A and B of the conduit 31: an adjustable throttle 33 and a check valve 34 respectively provided for the flow of the liquid to the valve 22 and to the lower chamber 28 of the cylinder device.

Figure 2:
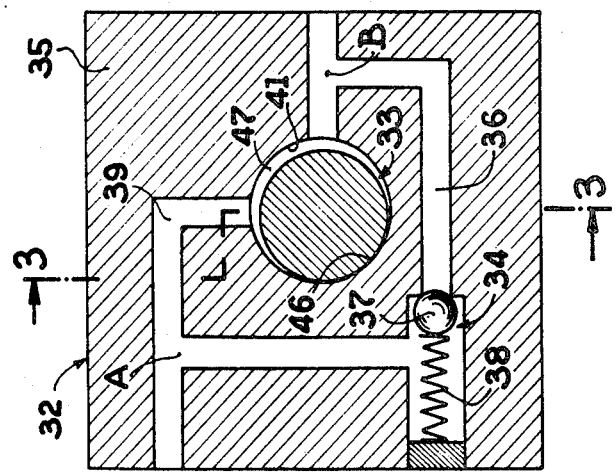
FIG. 2 is a diagrammatic sectional view of the flow regulator.

The check valve 34 in a conduit or passage 36 (FIG. 2) formed in the body of the regulator 32 is constituted by a ball 37 which is biased against its seat by a spring 38.

The throttle 33 inserted in the passage 39 in the body 35 of the regulator comprises a regulating element 42 disposed in a cylindrical bore 41 which communicates with the passage 39 and is perpendicular to the latter. The regulating element 42 has two bearing faces 43 journaled in the bore and, between the two bearing faces, an eccentric portion 44 in alignment with the passage 39. The eccentric portion 44, which is applied at 46 in sliding contact with the bore 41, has a diameter slightly less than that of the bore so as to define a narrow crescent-shaped chamber 47.

The angular position of the cylindrical element 42 can be regulated by means of a knob 48 which projects from the body 35 of the regulator so as to modify the position of the chamber 47 in the region of the eccentric portion 44 with respect to the passage 39 and thereby modify the section of passage of the liquid flowing through the regulator via the passage 39. More precisely, in respect of a circulation of liquid from the chamber 38 of the cylinder device 14, rotation of the element 42 in the counter-clockwise direction from the position shown in FIG. 2 increases the section of passage of the liquid. Rotation of the element 42 in the clockwise direction reduces this section which can be rendered nil when the arc 46 of the eccentric portion 44 faces the passage 39.

In order to saw the workpiece 2, the slide of the valve 22 is shifted to the right, as viewed in FIG. 1, to a position which puts the upper chamber 27 of the cylinder device 14 in communication with the delivery side of the pump 21 and causes the discharge of the liquid from the lower chamber 28 by way of the conduit 31. The rate of flow of this discharge, which governs the rate at which the band saw 6 descends, is determined by the regulator 32 since liquid cannot flow through passage 36 closed by the valve 37 and must flow through the passage 39 in which the throttle 33 is inserted. Consequently, the liquid passes through the chamber 47 in the region of the eccentric portion 44 at a constant rate of flow which depends on the angular position of this portion.

When the sawing operation is finished, the slide of the valve 22 is shifted to the left to a position which causes the liquid to flow under pressure from the pump 21 to the cylinder device 14 by way of the conduit 31. Thus, the liquid flows through the regulator 32 by separating the check valve bore 37 from its seat and also through the passage 39 if the position of the eccentric portion 44 permits. The pressurizing of the chamber 28 by means of the liquid flowing at a high rate achieves a rapid rise of the cradle.

By way of example, it might be mentioned that in respect of a machine capable of sawing round bars of 360 mm diameter, the inside diameter of the cylinder device 14 can be 100 mm so that it is possible to exert on the band saw 6, for a pressure of 50 bars in the working chamber 27, a force F which is about ten times higher than the opposing force F′ representing the resistance to sawing, whereas in a conventional machine the corresponding cylinder device has an inside diameter of 50 mm and the chamber of the cylinder device, which in the course of the descent has an increasing volume, has practically no pressure.

Having now described my invention what I claim and desire to secure by Letters Patent is:

1. In a method for sawing a workpiece by means of a cutting tool carried by a support which is movable with respect to a frame and subjected to the action of a double-acting hydraulic cylinder device having a piston defining a working chamber at one end of the cylinder device and a second chamber at another end of the cylinder device, the cylinder device being interposed between the support and the frame; the improvement that said method comprises feeding the cutting tool into the workpiece to be sawn, during the sawing operation and through the medium of the support, by the effect of a constant pressure of a liquid in the working chamber of the cylinder device so that the force exerted on the support by said pressure is a multiple of the maximum value of the resisting force which opposes the feed of the tool during cutting, said multiple being such that variations in said resisting force during cutting are negligible relative to said force exerted by said pressure, and causing the liquid contained in the second chamber of the cylinder device to flow in accordance with a constant rate of flow so that the rate of feed of the cutting tool into the workpiece is substantially constant irrespective of variations in said resisting force.

2. A method as claimed in claim 1, wherein the force exerted by said pressure is substantially ten times higher than said maximum value of said resisting force.

3. In a sawing machine comprising means defining a frame, a support movably mounted on the frame, a cutting tool carried by the support, a double-acting hydraulic cylinder device having a cylinder and a piston slidable in the cylinder and defining at a first end of the cylinder a first chamber and at another end of the cylinder a second chamber, the cylinder device being interposed between the frame and the support for shifting the support in a direction to feed the cutting tool into the workpiece, liquid supply means connected to said chambers and arranged to supply liquid selectively to the first chamber for shifting the support in a direction for feeding the tool into the workpiece and to the second chamber for shifting the support in a direction for returning the cutting tool to an inoperative position; the provision of the following structure: means for putting said liquid under such constant pressure that the pressure in said first chamber exerts a force on said support in the course of cutting which is a multiple of the maximum value of the resisting force which said tool encounters as it is fed into said workpiece during cutting, said multiple being such that variations in said resisting force during cutting are negligible relative to said force exerted by said pressure in said first chamber, a flow regulator communicating with said second chamber, the flow regulator comprising a manually regulatable throttle for ensuring a constant flow of the liquid discharged from said second chamber and a check valve which by-passes the throttle and is so arranged that the liquid flows freely through the check valve in the opposite direction during the inoperative return travel of the cutting tool to said inoperative position.

* * * * *